March 5, 1929.  A. C. HEINZEN  1,704,475
SNOWPLOW
Filed April 25, 1927   4 Sheets-Sheet 1
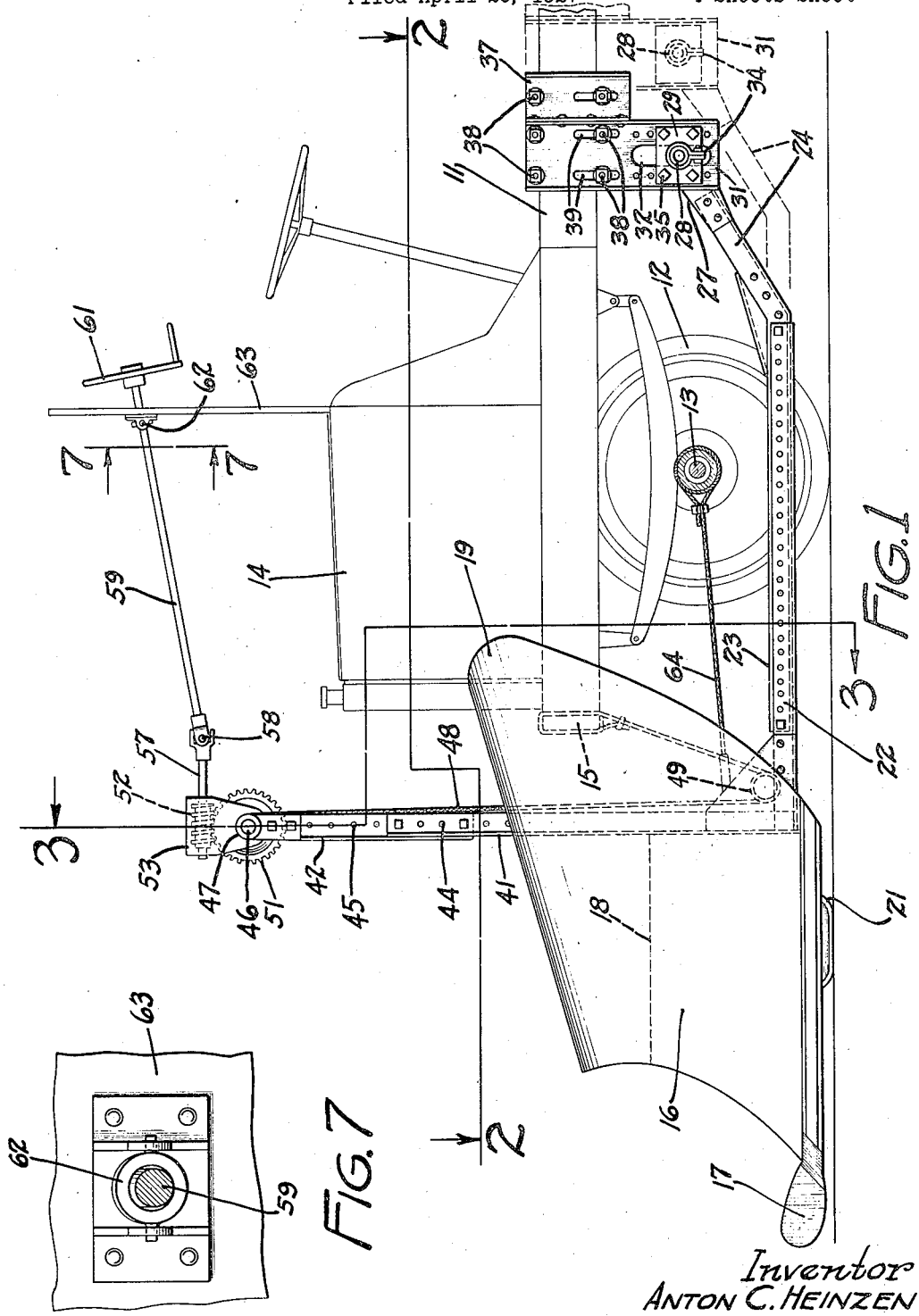
Inventor
ANTON C. HEINZEN
By Paul, Paul & Moore
Attorneys

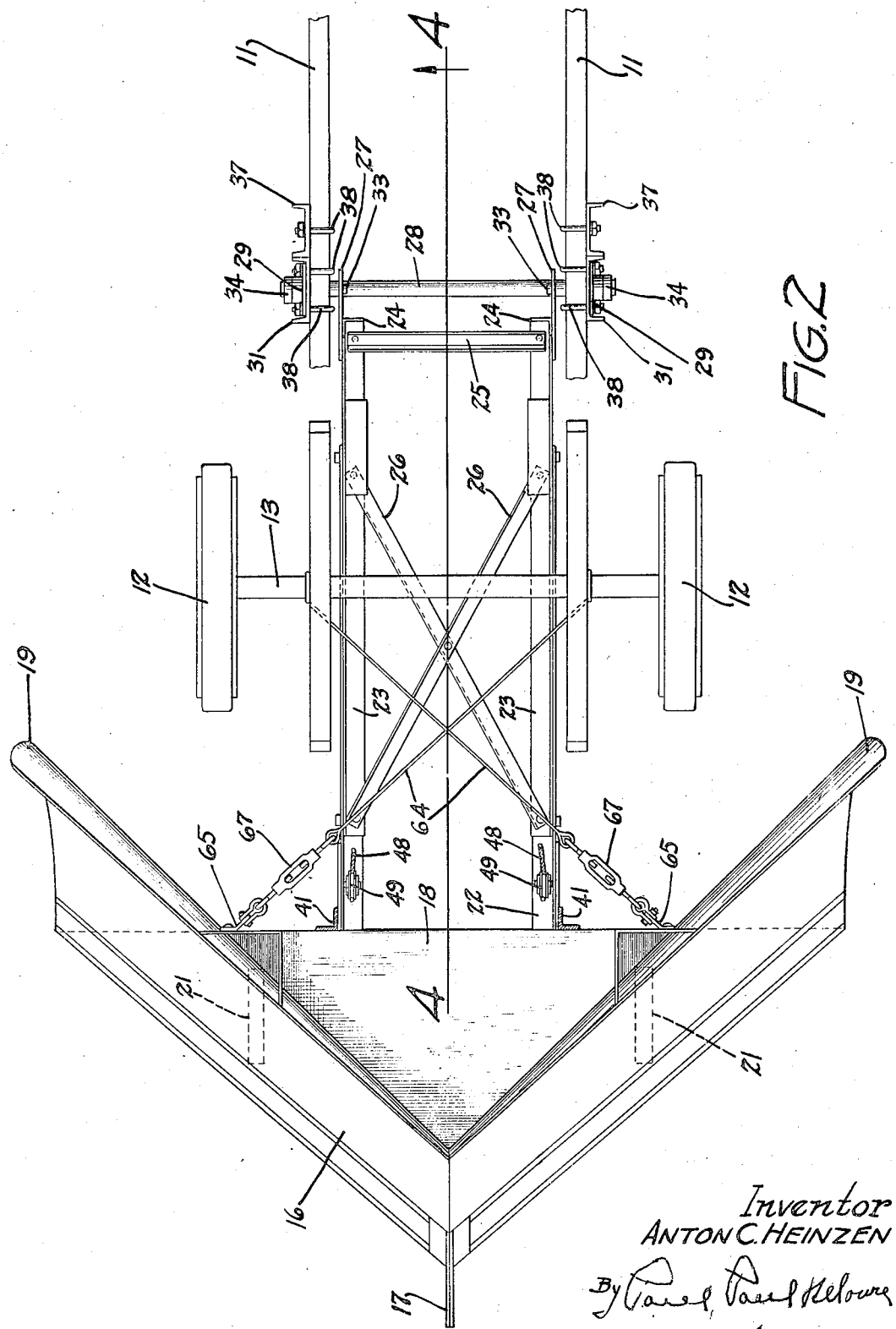

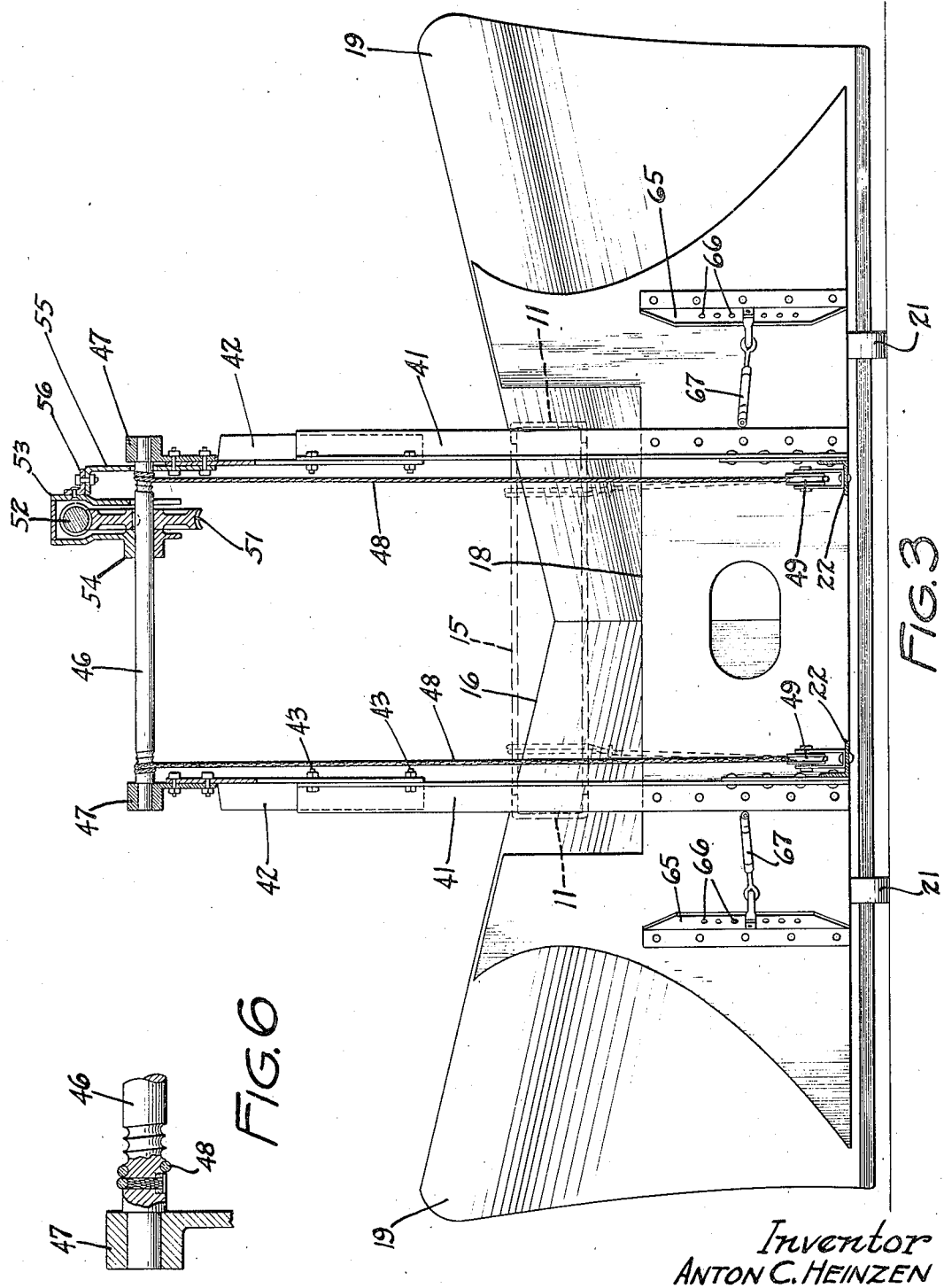

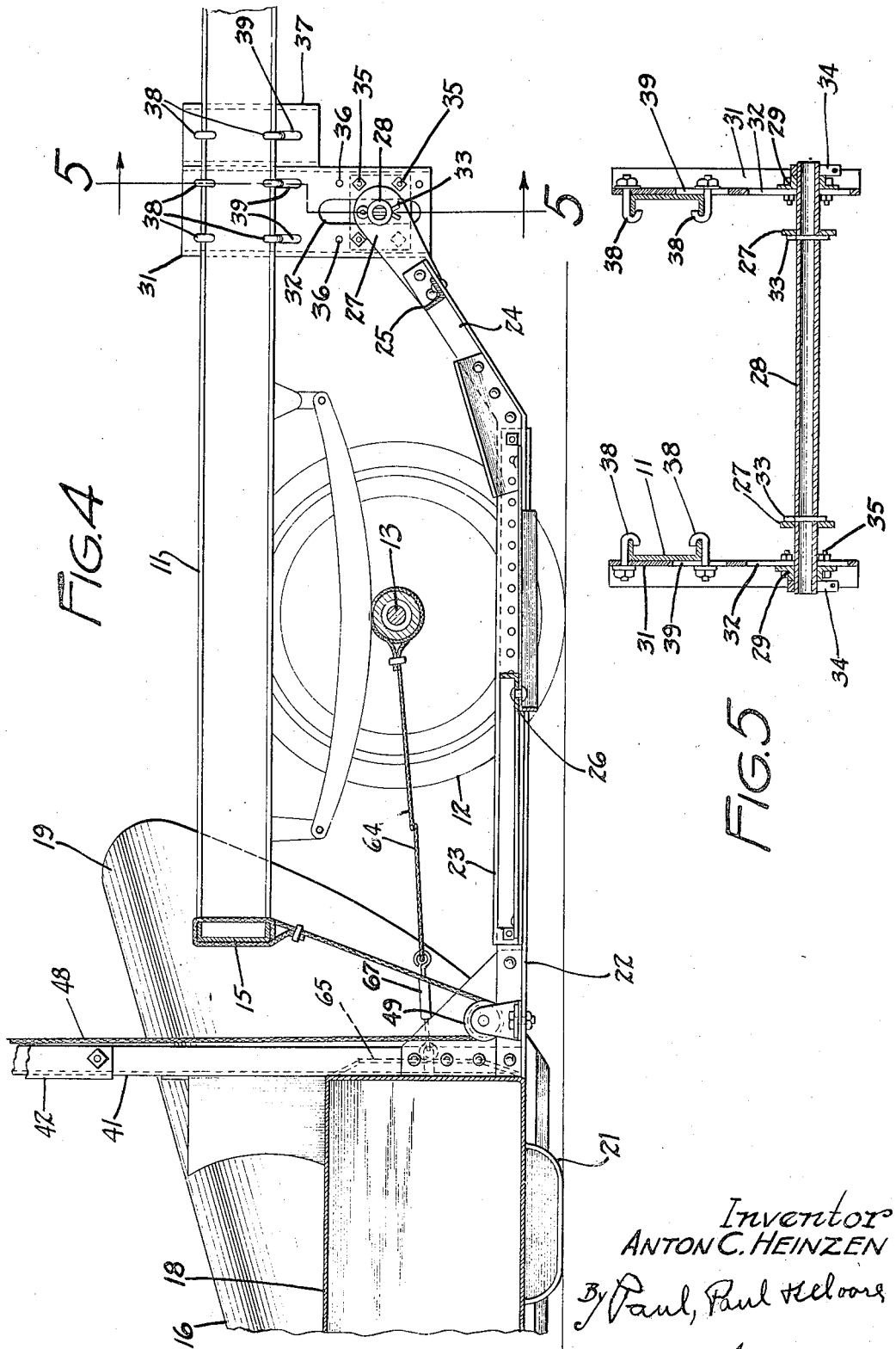

Patented Mar. 5, 1929.

1,704,475

UNITED STATES PATENT OFFICE.

ANTON CHARLES HEINZEN, OF WAUSAU, WISCONSIN, ASSIGNOR TO WAUSAU IRON WORKS, OF WAUSAU, WISCONSIN, A CORPORATION OF WISCONSIN.

SNOWPLOW.

Application filed April 25, 1927. Serial No. 186,519.

This invention relates to new and useful improvements in snow plows, generally, and more particularly relates to such an apparatus adapted for use in connection with a motor vehicle, such as a truck or bus, and an object of the invention is to provide a snow plow, designed in such a manner that it may readily and quickly be attached to the forward end of the vehicle in a minimum amount of time and which is provided with means for raising and lowering the plow with respect to the vehicle while traveling along a road way.

A further object of the invention is to provide a snow plow, having a thrust frame rearwardly extending therefrom and the rear end of which is provided with means for adjustably connecting them with the vehicle chassis so that the plow may be fitted or attached to vehicles of different sizes.

A further object of the invention is to provide a snow plow comprising a rearwardly extending frame, having means for adjustably connecting it with the side beams of the vehicle chassis in such a manner that it may be adjusted both vertically and horizontally, to properly position the plow with respect to the vehicle chassis, and uprights being provided adjacent the forward end of said frame, having a shaft mounted at the upper ends thereof, around which a cable is wound, which passes downwardly therefrom under a sheave or idler mounted adjacent the lower portions of the uprights and passing upwardly therefrom and having its other end secured to the vehicle frame or chassis, so that when the shaft is rotated, the snow plow may be vertically moved or raised and lowered with respect to the vehicle frame.

A further object of the invention is to provide a snow plow adapted to be detachably connected to the forward end of a motor vehicle, said plow having a rearwardly extending thrust frame adapted for longitudinal adjustment and at the forward end of which is mounted a pair of uprights having a shaft mounted in the upper ends thereof which is operable by means of a toothed operating mechanism, and said uprights being vertically adjustable, whereby the plow may be fitted to various types of motor vehicles.

The particular object of the invention therefore, is to provide an improved snow plow, adapted for use in connection with automotive vehicles, and other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification;

Figure 1 is a side elevation of the improved plow mounted upon a motor vehicle;

Figure 2 is a plan view of Figure 1;

Figure 3 is a cross sectional view on the line 3—3 of Figure 1, with the plow removed from the vehicle;

Figure 4 is an enlarged longitudinal sectional view on the line 4—4 of Figure 2;

Figure 5 is a detailed sectional view on the line 5—5 of Figure 4;

Figure 6 is an enlarged detailed sectional view, showing one end of the cable supporting shaft mounted in the upper portions of the uprights; and Figure 7 is a detailed sectional view on the line 7—7 of Figure 1, showing the means for supporting the operator's control shaft.

In the selected embodiment of the invention here shown, for purposes of disclosure, there is illustrated a portion of an automotive vehicle comprising the usual side beams 11 of the vehicle chassis, the front wheels 12, front axle 13, hood 14, and the cross member 15, connecting together the forward ends of the side beams 11.

The novel snow plow featured in this invention comprises the plow 16 having a nose blade 17 for cutting or separating the snow in advance of the plow. The plow 16 has a bulk head 18 for suitably bracing the outwardly flared wings 19 thereof, as shown in Figure 2. Suitable runners 21 are provided beneath the bulk head 18, adapted to engage the road surface to carry the weight of the plow, when in use.

The plow is supported upon the forward end of a thrust frame, comprising side frame members 22 adjustably bolted or secured to similarly shaped members 23, having their rear end portions 24 turned upwardly, as shown in Figures 1 and 4. These end portions 24 are connected together by means of a cross member 25, terminally secured thereto, as shown in Figure 2. Diagonal braces 26 cooperate with the cross members 25 to securely brace the side frame members 22 and 23. End plates 27 are terminally secured to the up-turned end portions 24 and are apertured to receive a cross shaft or rod 28, which preferably is hollow and has its end portions pivotally mounted in supports 29, adjustably secured to depending channel-shaped hangers 31, shown in Figures 1, 4, and 5. An elongated opening or slot 32 is provided in each hanger 31 adapted to be traversed by the end portions of the hollow shaft 28, as shown in Figure 5. The end plates 27 are retained in spaced relation by means of cotterpins 33 and the shaft 28 is held against longitudinal movement by means of split clamping rings 34, secured to each end thereof as shown. The supports 29 for the shaft 28 are held in adjusted positions by means of bolts 35 adapted to be received in apertures 36 provided in the hangers 31. Each hanger 31 is reinforced by means of a relatively smaller channel member 37, riveted thereto as shown in Figure 1. Hook bolts 38 secure the hangers 31 to the side beams 11 of the vehicle frame. The lower hook bolts 38 are mounted in slots 39 provided in the hangers 31 whereby the hook bolts 38 may be vertically adjusted with respect to one another to accommodate them to vehicle beams of different heights or depths. By means of the above described mechanism, the plow may be connected to practically all types of standard vehicle frames, regardless of the height, width or length thereof. The overall length of the shaft 28 is preferably such as to accommodate it to the widest vehicle chassis or frame.

In structures of this type, it is necessary that means be provided for raising and lowering the plow with respect to the vehicle frame, and that such adjustment or movement of the plow may be accomplished while the apparatus is in use. The means provided for thus relatively raising and lowering the plow 16 with respect to the vehicle chassis, resides in the provision of a pair of uprights 41 suitably secured to the rear portion of the bulk head 18 and to the forward ends of the frame members 22 of the plow thrust frame. Sections 42 are adjustably connected with the uprights 41 by means of bolts 43 receivable in the apertures 44 and 45, provided respectively in the upright portions of the uprights 41 and the sections 42. A cross shaft 46 is rotatably mounted in bearings 47 terminally secured to the upright sections 42. This shaft is preferably grooved adjacent each end to receive a pair of cables 48, each having one end wound upon the shaft 46 and passing downwardly therefrom beneath a pair of sheaves or idlers 49 and having their other ends secured to the vehicle chassis as, for instance, to the cross member 15 at the forward end thereof. Figure 6 illustrates the manner of securing the cables to the cross shaft 46.

The means provided for rotating the shaft 46 consists of a worm gear 51 keyed to the shaft 46 and operable by means of a worm 52, supported in a bracket 53, having one side supported upon the shaft 46 by means of a split bearing 54 and having its other side supported upon a standard 55, by means of an angle iron 56, shown in the upper portion of Figure 3. The worm 52 has a shaft 57 connected by a universal joint 58, to an operating shaft 59, having a hand wheel 61 terminally mounted thereon and positioned within the cab of the vehicle within convenient reach of the operator or driver. The rear portion of the operating shaft 59 is slidably supported in a pivotal support 62, mounted on the dash or front wall 63 of the vehicle cab, as shown in Figures 1 and 7.

The forward portion of the thrust frame, to which the plow is secured, is further braced against lateral strains by means of diagonal rods or cables 64, each having one end secured to the front axle 13 of the vehicle and having their other ends secured to the rear portion of the bulk head 18 by means of angle brackets 65. Each bracket 65 has a plurality of apertures 66 therein to provide vertical adjustment for the forward ends of the cables or rods 64. A suitable turn buckle 67 is interposed in each cable or rod 64, whereby they may be put under sufficient tension to rigidly support the forward end of the thrust frame, and thus retain the nose of the plow substantially in alignment with the vehicle chassis. The connections of the rods 64 with the bulk head 18, are preferably located so as to be substantially in horizontal alignment with the front axle 13 of the vehicle so that vertical adjustment of the plow with respect to the front axle will not materially change or vary the tension in the bracing members 64.

The novel snow plow featured in this invention is particularly well adapted for use on ordinary motor trucks or busses to clear the roadway or highway from snow. Its construction is such that it is applicable to practically all sizes of trucks. By means of the side members 22 and 23 of the plow thrust frame, the latter may be elongated or extended to fit vehicle frames of different lengths, and, also as a result of the clamp connection between the hangers 31 and the side beams 11 of the vehicle chassis, the shaft 28 may be relatively moved, both longitudinally and vertically, with respect to the beams 11 of the chassis frame. The vertical adjustment of the cross shaft 46 also affords means for properly positioning the shaft with respect to the cab of the vehicle, so that the operating wheel 61 may be conveniently positioned with respect to the driver's seat. It will also be noted that by mounting the lifting cables 48 in the manner above described, that is, each cable having one end secured to the chassis frame and passing downwardly beneath the idlers 49 and having its other end wound about the operating shaft 46, and having a worm drive for operating the shaft 46, that a tremendous leverage is obtained, whereby the plow 16 may readily and conveniently be moved into and out of engagement with the road surface, by the simple manipulation of the hand wheel 61.

I claim as my invention:

1. The combination with a motor vehicle including a pair of frame elements, of thrust members adapted to be demountably and adjustably secured to said frame elements and forwardly extending therefrom, uprights secured to the forward portions of said thrust members, a shaft rotatably mounted on said uprights adjacent the upper ends thereof, idlers mounted at the lower ends of said uprights, flexible elements each adapted to be secured at one end to the vehicle frame and to pass beneath the idlers and having their other ends operatively connected with said shaft, a snow plow attached to the uprights and movable therewith, and a device for rotating said shaft to vertically adjust the plow.

2. The combination with a motor vehicle including a pair of frame elements, of clamping devices adjustably secured to said frame elements, thrust members pivotally connected with said clamping devices and forwardly extending therefrom, uprights terminally secured to the forward portions of said thrust members, a shaft rotatably mounted on said uprights adjacent the upper ends thereof, means permitting vertical adjustment of said shaft upon said uprights, idlers mounted at the lower ends of the uprights, flexible elements each adapted to be secured at one end to the vehicle frame and to pass beneath the idlers and having their other ends operatively connected with said shaft, a snow plow attached to the uprights and movable therewith, and a worm and gear device for rotating said shaft to elevate the uprights and plow.

3. The combination with a motor vehicle including a pair of frame elements, of a pair of longitudinally adjustable thrust members, pivotally and adjustably secured to said frame elements, uprights terminally secured to the forward ends of the thrust members and also adapted for longitudinal adjustment, a shaft transversely mounted at the upper ends of said uprights, sheaves mounted adjacent the lower ends of the uprights, cables each having one end secured to the vehicle frame and passing downwardly therefrom and engaging the sheaves and having their other ends secured to said shaft, a snow plow secured to the uprights and movable therewith, and a worm-and-gear device at the upper ends of said uprights for rotating said shaft to wind the cables thereabout to elevate the uprights and plow.

4. The combination with a motor vehicle including a pair of frame elements, clamping devices adjustably secured to said frame elements, a thrust frame pivotally connected at one end to said frame elements and adapted for vertical adjustment with respect thereto, sectional uprights terminally secured to the forward ends of the thrust frame, a shaft transversely arranged at the upper ends of said uprights, sheaves mounted at the lower ends of the uprights, cables each having one end secured to the vehicle frame and passing downwardly therefrom and engaging the sheaves and having their other ends secured to said shaft, a snow plow secured to the uprights and movable therewith, and a worm and gear device at the upper ends of said uprights for rotating said shaft to wind the cable thereabout to elevate said uprights and plow.

5. An apparatus of the class described, comprising a thrust frame including longitudinally adjustable side members, hangers having means for connection with a vehicle frame or tractor, means for pivotally connecting the rear end portions of said side members to said hangers and permitting vertical adjustment of the members thereon, uprights secured to the forward end of the thrust frame, a bulk head secured to the uprights, a snow plow attached to the bulk head, flexible elements having a running connection with the forward end of the thrust frame and having means for connection with a vehicle frame, and a winding mechanism carried by the uprights and adapted to receive said flexible elements whereby the forward end of the thrust frame may be elevated to vertically adjust the plow.

6. An apparatus of the class described, comprising a thrust frame including longitudinally adjustable side members, the rear end portion of each side member being upwardly inclined and having an aperture therein, hangers having means for connection with a vehicle frame or tractor, a shaft supported in said hangers and traversing the apertures in the upturned end portions of said side frame members, and said shaft being mounted for vertical adjustment in said hangers.

In witness whereof, I have hereunto set my hand this 15th day of April, 1927.

ANTON CHARLES HEINZEN.